United States Patent Office 3,480,579
Patented Nov. 25, 1969

3,480,579
WATER REPELLENT COMPOSITIONS
Stuart Raynolds, Wilmington, Del., assignor to E. I. du Pont de Nemours and Company, Wilmington, Del., a corporation of Delaware
No Drawing. Filed July 8, 1965, Ser. No. 470,567
Int. Cl. C08g 37/30, 37/32; D06m 15/54
U.S. Cl. 260—28.5        10 Claims

ABSTRACT OF THE DISCLOSURE

A water-repellent composition comprising a melamine derivative having the structure

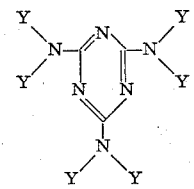

in which Y is $CH_2O$-alkyl or $CH_2O_2C$-alkyl, provided that at least two Y groups are the latter and at least one Y group is the former; a surfactant of the formula $R^3N(R^3)_2 \cdot HO_2CR^4$ wherein $R^2$, $R^3$ and $R^4$ are alkyl; and a wax.

The above composition which contains, additionally, an oil and water repellent fluorinated copolymer.

The process of treating a textile with a pad bath which contains either one of the above compositions.

---

The present invention is directed to compositions useful for rendering fabric materials water repellent.

Water-repellent compositions for treating fabric materials are of increasing commercial importance. Melamine formaldehyde condensates are widely used industrially as textile treating agents for various purposes, particularly as the active component in water-repellent compositions. However, one of the serious disadvantages to the use of melamine formaldehyde condensates in water-repellent compositions is their poor storage life in aqueous solutions. Since repellent compositions are usually applied to the fabric from aqueous solution, the insoluble melamine formaldehyde condensates must be dispersed in the aqueous solution with the aid of an additional material, such as surfactants or emulsifiers. However, since the melamine derivatives are soluble to some extent in water, the melamine derivative tends to hydrolyze, polymerize and coagulate in a useless form in the aqueous solution.

The use of aqueous bath solutions where the melamine derivatives have started to hydrolyze gives inconsistent results on the fabric, especially when the unstable melamine derivative is used in combination with a wax, such as paraffin wax. Efforts to overcome this instability problem of melamine derivatives have heretofore been unsuccessful. It is, therefore, necessary when using these products in textile treating mills to prepare the aqueous dispersions of the melamine derivatives immediately before use. Since such mills are usually not conveniently equipped to make such dispersions, it would be a great advance in the art and an economically attractive feature to textile treating mills if a water-repellent composition containing melamine-formaldehyde condensates could be produced of sufficient stability to be delivered to the mills as an aqueous dispersion ready for use.

Another disadvantage of present water-repellent compositions containing melamine derivatives is their lack of durability on the fabric. Durability is the measurement of the ability of the water repellent when cured on the fabric to resist being washed out of the fabric during subsequent treatments, such as washing and dry cleaning operations. It has long been recognized that the surfactant which is used originally to disperse the insoluble melamine derivative in the impregnating bath also aids in the solubilization of the water repellent during subsequent laundering and dry cleaning of the fabrics. It has also been recognized that the surfactant may act as a wetting agent on the surface of the fabric after laundering which effectively destroys water repellency. There is, therefore, a need for a surfactant which will disperse the melamine derivative in the aqueous impregnating bath but will not act as a surfactant dispersing or wetting agent on the impregnated fabric.

It is, therefore, an object of this invention to provide a composition containing melamine-formaldehyde condensation products which form stable aqueous dispersions useful as water repellents for textiles.

It is a further object of this invention to provide a water-repellent composition which when applied to fabric materials is highly resistant to washout during fabric laundering.

These and other objects will become apparent from the following description and claims.

More specifically, the present invention is directed to a solid composition comprising (a) a melamine derivative of structure

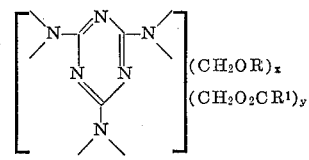

wherein R is an alkyl group of 1 to 6 carbon atoms, $R^1$ is an aliphatic hydrocarbon group of 11 to 23 carbon atoms, y is an integer from 2 to 5, and $x+y=6$,
(b) a wax, and
(c) a surfactant of formula $R^2N(R^3)_2 \cdot HO_2CR^4$, wherein $R^2$ is an alkyl group of 12 to 18 carbons, $R^3$ is an alkyl group of one to four carbons and $R^4CO_2H$ is an organic carboxylic acid of at least one carbon atom, the salt $R^2N(R^3)_2 \cdot HO_2CR^4$ containing a maximum of 25 carbons, and wherein the composition contains component (b) in an amount from zero to 80% by weight of components (a) plus (b) and the composition contains component (c) in an amount from 3% to 20% by weight of the total mixture.

The melamine-formaldehyde condensation products used in this invention are prepared by methods well known to the art, such as those described in U.S. Patent 2,398,569. Preferably, melamine is condensed with formaldehyde to give hexamethylol melamine which is in turn condensed with a lower aliphatic alcohol in the presence of a mineral acid to give hexaalkoxymethyl melamines. The hexaalkoxymethyl melamines are then condensed with from two to five moles, preferably about three moles, of a long-chain aliphatic acid to give the alkoxymethyl acyloxymethyl melamine derivatives.

Alcohols which may be condensed with hexamethylol melamine include methanol, ethanol and the isomeric propanols, butanols, pentanols and hexanols. The preferred alcohol is methanol. To form the melamine derivatives of this invention, the resulting hexaalkoxymethyl melamine is condensed with from two to five moles of a long-chain aliphatic acid such as lauric, tridecyclic, myristic, palmitic, margaric, stearic, arachidic, behenic and like saturated acids as well as unsaturated acids such as oleic, tetradecenoic, hypogalic, linoleic, linolenic, erucic, brassidic and elaidic acids. In this invention the preferred acids are those saturated acids containing from 20 to 22 carbon atoms. It has been found, however, especially when a lower melting melamine derivative is desired, that less than three moles of acid or the use of lower molecular weight acids such as lauric or palmetic acids is desirable. When higher melting melamine derivatives are desired, the use of more than three moles of acid and especially the higher molecular weight acids such as stearic or behenic acids is advisable.

As heretofore described, stable dispersions of melamine-formaldehyde condensation products have been impractical without the use of high molecular weight surfactants, such as polyvinyl alcohol. Besides causing "washout" of the repellent during fabric laundering, such surfactants tend to be undesirable since they often interfere with the operation of other materials in the impregnating bath causing inconsistencies in the textile treating operations. It has now been found that certain specific cationic surfactants gave stable dispersions without interfering with the impregnating operation. These surfactants have the formula $R^2N(R^3)_2 \cdot HO_2CR^4$, the carboxylic acid salts of tertiary amines. In order to be utilized in the compositions of this invention, these salts must contain at least 15 and at most 25 carbons. The tertiary amine $R^2N(R^3)_2$ contains an alkyl group $R^2$ of 12 to 18 carbons and two lower alkyl groups $R^3$ of 1 to 4 carbons. Such tertiary amines are generally available commercially. Examples of such useful amines are dodecyldimethylamine, dodecyldiethylamine, dodecyldibutylamine, tetradecyldimethylamine, tetradecyldiethylamine, hexadecyldimethylamine, hexadecyldiethylamine, and octadecyldimethylamine; the last named amine or equiweight mixtures with tetradecyldimethylamine are preferred. The carboxylic acids $R^4CO_2H$ are chosen from any aliphatic carboxylic acids capable of forming a salt with the tertiary amines. Since the tertiary amines as defined above must contain at least 14 carbons, the carboxylic acid may contain at most 11 carbons if the maximum limit of 25 carbons is to be met. In general, the lower carboxylic acids are most useful and preferred, such as formic, acetic, propionic, butyric and valeric acids. The tertiary amine and acid, as indicated, is chosen to contain less than 25 carbons. As heretofore described, to be effective in the present invention, the salts must contain at least 15 carbons, i.e., an amine of 14 carbons and formic acid. The preferred acid of this invention is acetic acid.

The surfactants utilized in the present invention are mild pH surfactants, and it has been unexpectedly found that the surfactant breaks down during the heat treatment used to cure the repellent material on the fabric. The destroyed surfactant, therefore, remains inactive on the fabric and does not accelerate the washout of the melamine derivative in subsequent washings or act as a wetting agent on the fabric. Furthermore, the surfactants of the present invention are unexpectedly effective in dispersing the melamine derivative in the aqueous bath while not causing rates of hydrolysis of the melamine derivative similar to those found with melamine derivatives having cationic charges in the molecule. Thus, the water-repellent compositions of this invention possess greater stability.

The wax component in the subject water-repellent composition may be present in the composition in an amount of from 0% to 80% of the mixture of wax and melamine derivative. The wax is chosen so that when in combination with the melamine derivative the resulting mixture has a sufficiently high melting point to be useful in textile treating equipment. Melting points in excess of 100° F. are required. Paraffin wax is preferred in the present invention.

When wax is not present in the composition of the present invention, either octadecyldimethylamine acetate or a mixture of equal parts of octadecyldimethylamine acetate and tetradecyldimethylamine acetate are the preferred surfactants. When wax is present in the composition, the mixture of octadecyldimethylamine acetate and tetradecyldimethylamine acetate is preferred because somewhat more stable dispersions are obtained with the surfactant mixture.

The compositions of this invention are readily dispersible in water. Such aqueous dispersions may contain up to about 50% by weight solids. There is, of course, no lower limit on the amount of solids. In textile treating pad baths, concentrations as low as 0.1% are often used. For shipping the aqueous dispersion, it is preferable for economic reasons to have the solid content as high as possible. Concentrated dispersions can be diluted at will without deleterious effect at the textile treating mills. For this reason, the preferred aqueous dispersions of the invention compositions contain from 2% to 50%, and most preferably from 15% to 30%. These aqueous dispersions are usually slightly acidic. However, in order to maintain a stable dispersion, the pH must be acidic and should not be higher than about 5.5.

The aqueous dispersions of the present invention are generally stable and possess long storage life. However, excessively high temperatures for long periods of time may cause the dispersions to coagulate. It has been found that the aqueous dispersions of this invention are stable for many months at temperatures in excess of 100° F. Freezing of the dispersion should be avoided as it causes coagulation.

The dispersions of this invention are useful for treating textile fabrics and the like to obtain water repellency. Since many textile treatment methods include somewhat elevated temperatures during application, it is desirable that the solids of these dispersions not melt in order to prevent the solids from padding out on the pad rolls. It is preferable, therefore, that the dispersion solids have melting points above the usual textile treatment temperature of 90° F. For this reason, the preferred melamine-formaldehyde condensation products or mixtures thereof with wax of this invention have melting points greater than 90° F. and preferably greater than 130° F. (55° C.). On the other hand, a heat curing step is usually involved in textile treatment processes. If curing is to be effective for the compositions of this invention, the melamine derivatives should have melting points lower than the curing temperature which is generally in the range of 300° F. to 340° F.

While the compositions of this invention will render textile fabrics and the like water repellent, these compositions are particularly useful in conjunction with fluorinated oil and water repellents. Examples of such fluorinated oil and water repellents are to be found in U.S. Patents 2,642,416; 3,102,103; 2,803,615; 2,592,069; 2,951,051; 2,732,320; 3,078,245; 2,841,573 and foreign patents such as Canada 697,656, Canada 680,900, Belgian 645,697, and French 1,333,768.

More specifically, the compositions of this invention are particularly useful when used in conjunction with a fluorinated oil and water repellent comprising from about 3% to about 60% by weight of a polymer prepared from at least one polymerizable fluorine-containing aliphatic compound of the structure $$CH_2=C(CH_3)CO_2CH_2CH_2C_nF_{2n+1}$$

wherein $n$ is an integer of from 3 to 14 and about 40% to about 99% by weight of a polymer prepared from at least one polymerizable vinyl compound chosen from $$CH_2=\overset{R^1}{\underset{|}{C}}CO_2R^2,\ CH_2=CHO_2CR^2,\ CH_2=CHR^3,\ CH_2=CHY,$$

$$CH_2=CY_2,\ CH_2=CHCH_2O_2CR^2,\ CH_2=CH-\overset{O}{\underset{||}{C}}-R^2,$$

$$CH_2=\overset{CH_3}{\underset{|}{C}}-CO_2CH_2CH_2N(R^4)_2,\ CH_2=CR^1CONHCH_2OH$$

1,2 - butadiene, 2-chlorobutadiene, 2,3-dichloro-1,3-butadiene, or isoprene, wherein $R^1$ is hydrogen or methyl, $R^2$ is a saturated alkyl group containing from 1 to 18 carbons, $R^3$ is phenyl or alkyl-substituted phenyl, $R^4$ is hydrogen or saturated alkyl groups of one to six carbons, and Y is fluorine, chlorine or bromine.

The solid compositions of this invention are usually applied to textiles in the range of 0.5 to 1% by weight of fabric although much higher concentrations may be used if desired. Pad baths or the like are prepared by adding a sufficient quantity of one of the dispersions of this invention to a pad bath containing the other desired textile treating agents such as the fluorinated oil and water repellents, crease-resistant agents, softeners, antistatic agents and the like. Only one precaution need be observed. The bath should not contain gross amounts of anionic surfactants as the anion of the anionic surfactants may combine with the cation of the tertiary amine salts used in this invention to form insoluble salts which will precipitate. Small amounts of anionic surfactants may be tolerated if one of the nonionic surfactants such as the well-known polyethylene oxide products is added to stabilize the bath. The presence of other dispersing agents of the cationic or nonionic types, metal salts and most other textile treating agents seems to have no effect.

Although it is not absolutely necessary, it has been found desirable to add an acid catalyst to the pad bath when applying the compositions of this invention to textiles. This is particularly true when using these compositions in conjunction with the fluorinated oil- and water-repellent materials described above. Certain zinc, magnesium or aluminum salts such as zinc nitrate, magnesium chloride or aluminum glycolate have been found to be particularly useful.

Although the application of these compositions by padding has been described above, they may also be applied by spraying, dipping or any other convenient means known to the art. After excess liquid has been removed, the textile is dried and heat cured as required. These materials may be applied to both natural and synthetic fabrics such as cotton, rayon, polyethylene terephthalate, polyacrylonitrile, nylon and blends thereof. The materials may also be applied to wool and woolen blends, leather and other porous substrates.

Representative examples illustrating the present invention follow. All parts are by weight unless otherwise specified. The preparation and use of the compositions of this invention and comparative results are obtained therewith by using the best available commercial products.

EXAMPLE 1

One mole of hexamethoxymethyl melamine and three moles of a commercial acid mixture containing 40% $C_{22}$ fatty acid, 50% $C_{20}$ fatty acid and 10% other acids were reacted using the procedure of Example 3 of U.S. Patent 2,398,569. An acid number analysis of the reaction mixture indicated that greater than 95% of the acid had been converted to the triacyloxymethyl trimethoxymethyl melamine.

When two, four or five moles of acid were used in the above procedure instead of three moles, substantially the same results were obtained. In addition, substantially the same results were obtained as those in the above example when the commercial acid mixture was replaced with two, three, four or five moles of any one of lauric, myristic, palmitic, oleic, or stearic acids. Similar results were also obtained when hexamethoxymethyl melamine was replaced with hexaethoxymethyl melamine or hexabutoxymethyl melamine.

EXAMPLE 2

Into 82.7 parts of water were added 0.82 part of octadecyldimethylamine and 0.48 part of acetic acid. The mixture was stirred until solution was complete. Then 16.5 parts of the solid reaction product of Example 1 (the product of hexamethoxymethyl melamine and commercial acid mixture) were added to the aqueous mixture. The mixture was agitated with high shear agitation while heating at about 80° C. until the solids were dispersed, about 10 minutes. The dispersion was then cooled with either mild agitation or no agitation.

The resulting dispersion contained 17.3% solids of which 95% were the melamine derivative and 5% the octadecyldimethylamine acetate. The aqueous dispersion had a pH of 4 to 4.5 and was stable for seven weeks at 100° F. or for several months at room temperature.

EXAMPLE 3

Into 82.1 parts water were added 0.42 part octadecyldimethylamine, 0.42 part tetradecyldimethylamine and 0.6 part acetic acid. The mixture was stirred until solution was complete. Then 8.25 parts of the melamine derivative of Example 1 (the product of hexamethoxymethyl melamine and commercial acid mixture) and 8.25 parts of wax (Atlantic 1115) were added to the aqueous mixture. The mixture was agitated under high shear while heating at about 80° C. until dispersion was complete, about 10 minutes. The dispersion was then cooled with either mild or no agitation to room temperature.

The dispersion contained 18% solids of which 47.5% was the melamine derivative, 47.5% paraffin wax, 2.5% tetradecyldimethylamine acetate and 2.5% octadecyldimethylamine acetate. This dispersion had essentially the same pH and stability as that of Example 2.

EXAMPLE 4

The procedure of Example 3 was repeated by dissolving a mixture of 0.63 part octadecyldimethylamine, 0.63 part tetradecyldimethylamine and 0.93 part acetic acid in 72.8 parts water, then adding 12.5 parts of the melamine derivative of Example 1 (the product of hexamethoxymethyl melamine and commercial acid mixture) and 12.5 parts of wax. The dispersion was formed by the same procedure as Example 3.

The resulting dispersion contained 27.2% solids of which 46% was melamine derivative, 46% wax and 8% amine acetates. The dispersion had a pH of about 3.8 and essentially the same stability as the dispersions of Examples 2 and 3.

The melamine water-repellent compositions of Examples 2, 3 and 4 were applied to various fabrics and the water repellency of such fabrics tested according to the following procedures.

The various types of fabrics tested were treated in the following manner. Where it is indicated in the following examples that specific bath concentrations were used, the baths were merely made up to the indicated strengths. Where it is indicated that the concentrations are measured as on weight of fabric (OWF), the fabric was first passed through the padding apparatus containing pure water and the wet pickup determined. Based on these determinations, bath strengths were adjusted to give the desired pickup of water-repellent composition measured as on weight of fabric (OWF).

The apparatus consisted of a typical pad bath, squeeze rolls to remove excess liquid, a curing oven and a heated pressing apparatus. The fabric was passed through the bath maintained at 80° F. to 90° F. and the excess liquid was removed with the squeeze rolls. The treated fabric was cured for about two minutes, then pressed dry at temperatures suitable for the particular fabric being treated.

The water repellencies of the treated fabric samples were measured by using A.A.T.C.C. Standard Test Method 22–1952 of the American Association of Textile Chemists and Colourists. Under this test, a rate of 100 denotes no water penetration or surface adhesion. As the rating goes down the scale from 100 to 0, the water repellency progressively decreases, for example, a rating of 90 denotes slight random sticking or wetting.

The oil repellency test used in the following examples comprises placing a drop of test solution carefully on the textile on a flat horizontal surface. After three minutes, any penetration or wicking into the fabric is noted visually. To aid in the observation, the test solution can contain a small amount of oil-soluble blue dye to improve visibility. The nature of the test solutions is shown below. Nujol, of course, is a purified petroleum oil. Anything with a rating of five or greater is good or excellent, whereas anything with a rating of one or over can be used only for certain purposes. As an example of the rating method, if a treated fabric repels solution No. 6 listed below, but not the seventh solution, its rating is 6.

| Test solution | Oil repellency rating |
|---|---|
| n-Heptane | 9 |
| n-Octane | 8 |
| n-Decane | 7 |
| n-Dodecane | 6 |
| n-Tetradecane | 5 |
| 50–50—n-hexadecane-Nujol | 4 |
| 25–75—hexadecane-Nujol | 3 |
| Nujol | 2 |
| Wet by Nujol | 0 |

To test durability, the treated fabrics were subjected to standard washings and dry cleanings. A standard washing consists of immersing the fabric sample for 15 minutes with agitation in water at 70° C. to 80° C. containing 0.2% by weight of a heavy duty, built detergent, rinsing the washed fabric in boiling water, then cold water and finally ironing the fabric at 235° F. A standard dry cleaning consists of agitating the fabric sample for 20 minutes with tetrachloroethylene containing 2.5% by weight commercial dry cleaning detergent and 0.5% water at 80° F. and then drying and ironing the fabric at 235° F.

TABLE I

| Test Number | Dispersion of Example 4 Percent OWF [a] | Catalyst RB [b] Percent OWF [a] | Zn(NO₃)₂·4H₂O Percent OWF | "Aerotex" [c] Percent OWF | MgCl₂·6H₂O Percent OWF | Water Repellencies Fabric [d][e] | | | | | | | | | | | |
|---|---|---|---|---|---|---|---|---|---|---|---|---|---|---|---|---|---|
| | | | | | | Fabric A | | | Fabric B | | | Fabric C | | | Fabric D | | |
| | | | | | | Init. | 3SL | 3SDC | Init. | 3SL | 3SDC | Init. | 3SL | 3SDC | Init. | 3SL | 3SDC |
| 1 | 4 | | | | | 100 | 50 | 50 | | | | | | | | | |
| 2 | 8 | | | | | 100 | 50 | 50 | 100 | 70 | 70 | | | | | | |
| 3 | 4 | 0.4 | | | | 100 | 50 | 50 | 90 | 70 | 70 | | | | | | |
| 4 | 8 | 0.8 | | | | 100 | 50 | 50 | 100 | 70 | 70 | | | | | | |
| 5 | 4 | | 0.4 | | | 100 | 50 | 50 | 100 | 50 | 70 | | | | | | |
| 6 | 8 | | 0.8 | | | 100 | 50 | 50 | 100 | 70 | 70 | | | | | | |
| 7 | 4 | | | 5.0 | | 100 | 70 | 70 | 100 | 70 | 70 | | | | | | |
| 8 | 8 | | | 5.0 | 0.5 | 90+ | 70 | 70 | 100 | 70 | 70 | | | | | | |
| 9 | 4 | | 0.4 | 5.0 | 0.5 | 100 | 70 | 70 | 100 | 70 | 70 | | | | | | |
| 10 | 8 | | 0.8 | 5.0 | | | | | | | | | | | | | |
| 11 | 3 | | | | | | | | | | | 100 | 70 | 50 | 80 | 50 | 50 |
| 12 | 6 | | | | | | | | | | | 100 | 70 | 50 | 80 | 50 | 50 |
| 13 | 3 | | 0.3 | | | | | | | | | 100 | 70 | 50 | 70 | 50 | 50 |
| 14 | 6 | | 0.6 | | | | | | | | | 100 | 50 | 50 | 70 | 50 | 0 |
| 15 | 3 | | | 5.0 | | | | | | | | 100 | 70 | 50 | 100 | 50 | 50 |
| 16 | 6 | | | 5.0 | | | | | | | | 100 | 50 | 50 | 100 | 50 | 50 |
| 17 | 3 | | | 5.0 | [f] 0.5 | | | | | | | 100 | 80 | 70 | 100 | 70 | 50 |
| 18 | 6 | | | 5.0 | [f] 0.5 | | | | | | | 100 | 70 | 50 | 100 | 80 | 50 |
| 19 | 3 | | | | [g] | | | | | | | 100 | 70 | | 100 | 90 | |
| 20 | 6 | | | | [g] | | | | | | | 100 | 90 | | 100 | 100 | 0 |

[a] Percent OWF, percent on weight of fabric.
[b] Catalyst RB, a mixture of 2 parts aluminglycolate and one part glycolic acid used to catalyze polymerization of melamine derivative on fabric (CIBA Corp.).
[c] "Aerotex" Resin 23 Special, a water-soluble melamine-formaldehyde condensate used as Crease-Proofing agent (American Cyanamid Co.).
[d] Fabric A cotton poplin, Fabric B cotton sateen, Fabric C 65/35 "Dacron"/cotton, Fabric D nylon taffeta.
[e] 3SL—after three standard launderings, 3SDC—after three standard dry cleanings.
[f] 3% on nylon taffeta.
[g] 0.3% on nylon taffeta.

Water and oil repellencies were again evaluated after the washing and dry cleaning operations.

EXAMPLE 5

Pad baths were prepared using the aqueous dispersion of Example 4 to give the on weight of fabric pickups indicated in Table I below. Fabric samples of cotton poplin, cotton sateen, nylon taffeta and 65/35 "Dacron"-cotton blend ("Dacron" is Du Pont's trade name for polyethylene terephthalate fiber) were treated in the pad baths at 90° F. The cotton and cotton-blend fabrics were cured at 340° F., the nylon at 300° F., all for two minutes. Water repellencies of the fabric samples were determined initially and after three launderings or three dry cleanings. The conditions and results of these tests are shown in Table I.

EXAMPLE 6

Pads baths were prepared using the aqueous dispersions of Example 4 to give the on weight of fabric pickups indicated in Table II below. Fabric samples of cotton sateen and nylon taffeta were treated in the pad baths at 90° F. The cotton was cured at 340° F. for two minutes, the nylon at 300° F. for two minutes. Water repellencies were then determined, initially and after three launderings. The conditions and results are shown in Table II.

The dispersion of Example 4 contains approximately 25% active ingredient, while Water Repellent Composition A, a commercial water repellent comprising a mixture of 25% paraffin wax and 75% melamine-formaldehyde condensate prepared by the reaction of hexamethoxymethyl melamine with (1) stearic acid, (2) triethanolamine and (3) acetic acid, contains approximately 50% active ingredient.

TABLE II

| Test No. | Solids of Dispersion of Example 4, percent OWF(a) | "Water-Repellent Composition A," percent OWF | Water Repellencies, Fabrics(b) | | | |
|---|---|---|---|---|---|---|
| | | | A | | B | |
| | | | Init. | 3SL(c) | Init. | 3SL(c) |
| 1 | 1.0 | | 70 | 50 | | |
| 2 | 2.0 | | 100 | 70 | | |
| 3 | 4.0 | | 100 | 80 | | |
| 4 | 6.0 | | 100 | 80 | | |
| 5 | 8.0 | | 100 | 90+ | | |
| 6 | 10.0 | | 100 | 80 | | |
| 7 | 12.0 | | 100 | 80+ | | |
| 8 | 0.5 | | | | 50 | 50 |
| 9 | 1.0 | | | | 90 | 50 |
| 10 | 2.0 | | | | 90 | 50 |
| 11 | 3.0 | | | | 90 | 50 |
| 12 | 4.0 | | | | 100 | 50 |
| 13 | | 0.5 | 90 | 80 | | |
| 14 | | 1.0 | 100 | 90 | | |
| 15 | | 2.0 | 100 | 100 | | |
| 16 | | 3.0 | 100 | 100 | | |
| 17 | | 4.0 | 100 | 90+ | | |
| 18 | | 5.0 | 100 | 90+ | | |
| 19 | | 6.0 | 100 | 90+ | | |
| 20 | | 0.25 | | | 50 | 50 |
| 21 | | 0.5 | | | 50 | 50 |
| 22 | | 1.0 | | | 80 | 50 |
| 23 | | 1.5 | | | 100 | 50 |
| 24 | | 2.0 | | | 100 | 50 |
| 25 | | 3.0 | | | 90+ | 50 |

(a) Percent OWF=Percent on weight of fabric.
(b) Fabric A, cotton sateen; Fabric B, nylon taffeta.
(c) 3SL, after three standard launderings.

EXAMPLES 7–37

Pad baths were prepared using the aqueous dispersions of Examples 2, 3 and 4 to give the pickups indicated in Table III below. Fabric samples of cotton poplin, cotton sateen, and 65/35 "Dacron"/cotton blends ("Dacron" is Du Pont's trade name for polyethylene terephthalate fiber) were treated in the pad baths at 90° F. The samples were dried at 340° F. and cured for two minutes at 340° F. The conditions and results are shown in Table III below.

TABLE III

| | Commercial Fluorinated Oil and Water Repellent | | Melamine Dispersion | | Water-Repellent Comp. A | Aerotex(c) percent OWF | Aerotex(d) percent OWF | MgCl₂ 6H₂O percent OWF | Catalyst RB(e) percent OWF | Igepal(f) percent OWF |
|---|---|---|---|---|---|---|---|---|---|---|
| | Type(a) | Percent OWF(b) | Ex. | Solids, percent OWF | Solids, percent OWF | | | | | |
| Example: | | | | | | | | | | |
| 7 | A | 2.5 | 2 | 0.1 | | 5 | | 0.5 | 0.025 | 0.025 |
| 8 | A | 2.5 | 2 | 0.2 | | 5 | | 0.5 | 0.05 | 0.025 |
| 9 | A | 2.5 | 2 | 0.3 | | 5 | | 0.5 | 0.075 | 0.025 |
| 10 | A | 2.5 | 2 | 0.4 | | 5 | | 0.5 | 0.10 | 0.025 |
| 11 | A | 2.5 | 2 | 0.5 | | 5 | | 0.5 | 0.125 | 0.025 |
| 12 | A | 2.2 | 2 | 4.0 | | 5 | | 0.5 | 1.00 | 0.022 |
| 13 | A | 2.2 | 2 | 6.0 | | 5 | | 0.5 | 1.50 | 0.022 |
| 14 | A | 2.2 | 2 | 8.0 | | 5 | | 0.5 | 2.00 | 0.022 |
| 15 | A | 2.5 | 3 | 3.0 | | 3.6 | 1.0 | 0.9 | 0.125 | |
| 16 | A | 2.5 | 4 | 0.5 | | 4 | | 0.4 | | 0.025 |
| 17 | A | 2.5 | 4 | 1.0 | | 4 | | 0.4 | | 0.025 |
| 18 | A | 2.5 | 4 | 2.0 | | 4 | | 0.4 | | 0.025 |
| 19 | A | 2.5 | 4 | 2.0 | | 5 | | 0.5 | 0.12 | 0.025 |
| 20 | A | 2.5 | 4 | 2.0 | | 5 | | 0.5 | 0.24 | 0.025 |
| 21 | A | 2.5 | 4 | 2.0 | | 5 | | 0.5 | | 0.025 |
| 22 | A | 2.5 | | | 1.2 | 5 | | 0.5 | 0.30 | 0.025 |
| 23 | A | 2.2 | | | 0.6 | 5 | | 0.5 | 0.15 | 0.220 |
| 24 | A | 2.5 | | | 0.25 | 4 | | 0.4 | 0.062 | 0.025 |
| 25 | A | 2.5 | | | 0.50 | 4 | | 0.4 | 0.125 | 0.025 |
| 26 | A | 2.5 | | | 1.0 | 4 | | 0.4 | 0.25 | 0.025 |
| 27 | A | 2.5 | | | 0.8 | 5 | | 0.5 | 0.2 | 0.025 |
| 28 | A | 2.5 | | | 0.8 | 5 | | 0.5 | 0.1 | 0.025 |
| 29 | B | 2.2 | 2 | 4.0 | | 5 | | 0.5 | 1.0 | 0.022 |
| 30 | B | 2.2 | 2 | 6.0 | | 5 | | 0.5 | 1.5 | 0.022 |
| 31 | B | 2.2 | 2 | 8.0 | | 5 | | 0.5 | 2.0 | 0.022 |
| 32 | B | 2.5 | 3 | 3.0 | | 3.6 | 1.0 | 0.9 | 0.125 | |
| 33 | B | 2.2 | | | 0.6 | 5 | | 0.5 | 0.25 | 0.022 |
| 34 | B | 2.5 | | | 0.5 | 3.6 | 1.0 | 0.9 | 0.125 | |
| 35 | C | 1.5 | 3 | 3.0 | | 3.6 | 1.0 | 0.9 | 0.125 | |
| 36 | C | 1.5 | | | 0.5 | 5 | 1.0 | 0.9 | 0.125 | |
| 37 | C | 1.3 | | | 0.6 | 5 | | 0.5 | 0.15 | 0.013 |

See footnote at end of table.

For comparison, a commercial water repellent comprising a mixture of 25% paraffin wax and 75% melamine-formaldehyde condensate prepared by the reaction of hexamethoxymethyl melamine with (1) stearic acid, (2) triethanolamine and (3) acetic acid (designated in Table III as Water-Repellent Composition A) was impregnated on similar fabric samples and tested by the same procedures used to test the compositions of this invention.

The temperature of aging of the dispersion and repellencies obtained on white cotton poplin with the aged dispersion are shown below in Table IV.

TABLE IV

| | | Repellencies | | | | | |
|---|---|---|---|---|---|---|---|
| | Temperature of Aging, °F. | Initial | | 3SL [1] | | 3SDC [1] | |
| | | Oil | Water | Oil | Water | Oil | Water |
| Time of Aging: | | | | | | | |
| 4 months | Room temp | 7 | 100 | 7 | 90 | 7 | 80 |
| 2 weeks | 100 | 7 | 100 | 7 | 80 | 8 | 90 |
| 7 weeks | 100 | 7 | 100 | 6 | 90 | 7 | 80 |
| 2 weeks | 110 | 6 | 100 | 5 | 80 | 7 | 80 |
| Do | 120 | 4 | 100 | 3 | 80 | 4 | 50 |

[1] 3SL, after 3 standard launderings, 3SDC, after 3 standard dry cleanings.

When commercially available Water-Repellent Composition A (see Example 6 for composition) is made up into a similar aqueous dispersion and aged for similar periods as those described above, it polymerizes and precipitates. The resulting separated material cannot be applied to Water and Oil Repellencies

| | Fabric A [g] | | | | | | Fabric B [g] | | | | | | Fabric C [g] | | | | | |
|---|---|---|---|---|---|---|---|---|---|---|---|---|---|---|---|---|---|---|
| | Init. | | 3SL [h] | | 3SDC [i] | | Init. | | 3SL [h] | | 3SDC [i] | | Init. | | 3SL [h] | | 3SDC [j] | |
| | Oil | Water | Oil | Water | Oil | Water | Oil | Water | Oil | Water | Oil | Water | Oil | Water | Oil | Water | Oil | Water |
| Example: | | | | | | | | | | | | | | | | | | |
| 7 | 5 | 100 | 4 | 80 | 4 | 80 | 7 | 100 | 6 | 80 | 7 | 90 | | | | | | |
| 8 | 6 | 90 | 5 | 80 | 6 | 80 | 7 | 100 | 7 | 80 | 7 | 80 | | | | | | |
| 9 | 6 | 100 | 6 | 80 | 5 | 80 | 7 | 100 | 7 | 90 | 7 | 80 | | | | | | |
| 10 | 6 | 100 | 7 | 90 | 6 | 80 | 7 | 100 | 7 | 80 | 8 | 80 | | | | | | |
| 11 | 7 | 100 | 7 | 90 | 7 | 80 | 7 | 100 | 7 | 90 | 8 | 90 | | | | | | |
| 12 | 7 | 100 | 6 | 90 | 5 | 80 | 7 | 100 | 7 | 90 | 7 | 90 | 6 | 100 | 5 | 80 | 5 | 80 |
| 13 | 7 | 100 | 6 | 90 | 5 | 80 | 7 | 100 | 7 | 100 | 7 | 90 | 7 | 100 | 5 | 80 | 6 | 70 |
| 14 | 7 | 100 | 6 | 90 | 5 | 80 | 7 | 100 | 7 | 90 | 7 | 80 | 6 | 100 | 6 | 80 | 6 | 70 |
| 15 | 7 | 100 | 7 | 100 | 6 | 90 | 8 | 100 | 7 | 80 | 8 | 90 | | | | | | |
| 16 | 7 | 80 | 7 | 80 | 7 | 70 | 7 | 80 | 6 | 70 | 8 | 70 | | | | | | |
| 17 | 7 | 100 | 7 | 80 | 7 | 70 | 7 | 80 | 6 | 80 | 8 | 80 | | | | | | |
| 18 | 7 | 100 | 7 | 80 | 7 | 80 | 8 | 100 | 7 | 80 | 8 | 80 | | | | | | |
| 19 | | | | | | | 8 | 100 | 8 | 70 | 8 | 70 | 7 | 100 | 5 | 80 | 6 | 90 |
| 20 | | | | | | | 8 | 100 | 8 | 80 | 8 | 80 | 7 | 100 | 4 | 70 | 6 | 80 |
| 21 | | | | | | | 8 | 100 | 7 | 80 | 8 | 80 | 6 | 100 | 5 | 70 | 7 | 80 |
| 22 | 6 | 100 | 7 | 100 | 4 | 70 | 7 | 100 | 7 | 90 | 3 | 70 | | | | | | |
| 23 | 7 | 90 | 7 | 90 | 7 | 80 | 7 | 100 | 7 | 80 | 6 | 80 | 7 | 80 | 6 | 80 | 5 | 70 |
| 24 | 8 | 100 | 7 | 90 | 8 | 80 | 7 | 80 | 6 | 70 | 7 | 80 | | | | | | |
| 25 | 8 | 100 | 8 | 90 | 7 | 70 | 7 | 80 | 7 | 70 | 8 | 80 | | | | | | |
| 26 | 7 | 100 | 8 | 100 | 6 | 80 | 8 | 80 | 8 | 80 | 7 | 80 | | | | | | |
| 27 | | | | | | | 8 | 100 | 8 | 80 | 8 | 70 | 7 | 100 | 5 | 80 | 6 | 80 |
| 28 | | | | | | | 7 | 90 | 7 | 80 | 7 | 80 | 7 | 100 | 5 | 80 | 6 | 80 |
| 29 | 7 | 100 | 6 | 90 | 5 | 80 | 7 | 100 | 7 | 90 | 7 | 90 | 6 | 100 | 5 | 80 | 5 | 80 |
| 30 | 7 | 100 | 6 | 90 | 5 | 80 | 7 | 100 | 7 | 100 | 7 | 90 | 7 | 100 | 5 | 80 | 6 | 70 |
| 31 | 7 | 100 | 6 | 90 | 5 | 90 | 7 | 100 | 7 | 90 | 7 | 80 | 6 | 100 | 6 | 80 | 6 | 70 |
| 32 | 7 | 100 | 7 | 100 | 7 | 90 | 7 | 100 | 3 | 70 | 7 | 80 | | | | | | |
| 33 | 7 | 90 | 6 | 80 | 2 | 80 | 7 | 90 | 7 | 80 | 7 | 80 | 7 | 80 | 2 | 80 | 0 | 70 |
| 34 | 7 | 100 | 7 | 100 | 6 | 80 | 7 | 90 | 4 | 80 | 8 | 80 | | | | | | |
| 35 | 6 | 100 | 6 | 90 | 6 | 90 | 6 | 100 | 6 | 80 | 5 | 80 | | | | | | |
| 36 | 6 | 100 | 6 | 80 | 6 | 80 | 6 | 100 | 6 | 80 | 5 | 80 | | | | | | |
| 37 | 6 | 100 | 6 | 90 | 4 | 80 | 6 | 90 | 6 | 80 | 6 | 80 | 5 | 80 | 5 | 80 | 4 | 80 |

[a] Type A—A mixture of fluorinated and nonfluorinated polymers as disclosed in Belgian Patent 645,697 or 634,770, Canadian Patent 697,656, French Patent 1,327,328, Japanese Patent 434,522, Spanish Patent 298,734, British Patent 971,732 or Italian Patent 667,479.
Type B—A mixture of fluorinated and nonfluorinated polymers, similar to Type A except that it contains a polymerizable nonconjugated divinyl compound free of non-vinylic fluorine.
Type C—"Scotchgard" FC208 (Minnesota Mining and Mfg. Co.), a copolymer of $C_8F_{17}SO_2N(C_3H_7)(CH_2)_2O_2CCH=CH_2$, as disclosed in U.S. Patent 2,803,615.
[b] Percent OWF= Percent on weight of fabric.
[c] Aerotex Resin 23 Special—A water-soluble melamine-formaldehyde condensate used as a crease-proofing agent (American Cyanamid Co.).
[d] Aerotex MD—A product similar to "Aerotex" Resin 23 but less water soluble, crease-proofing agent (American Cyanamid Co.).
[e] Catalyst RB—A mixture of 2 parts aluminglycolate and one part glycolic acid used to catalyze polymerization of melamine derivative (CIBA Corp.).
[f] Igepal CO-630-nonylphenoxypoly(ethyleneoxy)ethanol (Antara Chem. Co.).
[g] Fabric A 65/35 "Dacron"/cotton blend, B white cotton poplin, C cotton sateen.
[h] 3SL, after three standard launderings.
[i] 3SDC, after three standard dry cleanings.

EXAMPLE 38

Samples of the aqueous dispersion of Example 4 were aged for various periods of time at various temperatures before being applied to fabrics. The pad bath had the following composition, in percent on weight of fabric:

| | |
|---|---|
| A mixture of fluorinated and non-fluorinated polymers as disclosed in Belgian Patent 645,697 or 634,770, Canadian Patent 697,656, French Patent 1,327,328 | 2.0 |
| Solids dispersion of Example 4 | 0.5 |
| "Aerotex" Resin 23 Special (see footnote c, Table I) | 5.0 |
| $MgCl_2 \cdot 6H_2O$ | 0.5 |
| "Igepal" 10–630 (see footnote f, Table III) | 0.02 |
| Catalyst RB (see footnote b, Table I) | 0.125 | textiles, and hence repellency data is not available for comparison.

EXAMPLE 39

Into 82.7 parts of water were added 1.64 parts of octadecyldimethylamine and 0.96 part acetic acid. The mixture was stirred until solution was complete, then 16.5 parts of the solid reaction product of Example 1 (the product of hexamethoxymethyl melamine and commercial acid mixture) were added to the aqueous mixture. The mixture was agitated with high shear at about 80° C. until the solids were dispersed, about 10 minutes. The dispersion was then cooled with either mild agitation or no agitation. The resulting dispersion contained 17.3% solids of which approximately 90% were the melamine derivative and 10% the octadecydimethylamine acetate.

The aqueous dispersion had a pH of 4 to 4.5 and was stable for several weeks at 100° F. or for several months at room temperature.

EXAMPLE 40

One mole of hexamethoxymethyl melamine and 3 moles of stearic acid were reacted by using the procedure of Example 3 of U.S. Patent 2,398,569. An acid number analysis of the reaction mixture indicated that greater than 95% of the acid had been converted to the triacyloxymethyl trimethoxymethyl melamine.

The solid reaction product in the amount of 16.5 parts was added to an aqueous mixture of 82.7 parts of water, 0.82 part of octadecyldimethylamine and 0.48 part of acetic acid. The mixture was agitated with high shear agitation while heating at about 80° C. until the solids were dispersed, about 10 minutes. The dispersion was then cooled with either mild agitation or no agitation. The solids of the resulting dispersion consisted of 95% of the melamine derivative and 5% of octadecyldimethylamine acetate. The aqueous dispersion had a pH of 4 to 4.5 and was stable for several weeks at 100° F. or for several months at room temperature.

EXAMPLE 41

Into 82.1 parts water were added 0.42 part octadecyldimethylamine, 0.42 part tetradecyldimethylamine and 0.6 part acetic acid. The mixture was stirred until solution was complete, then 12.38 parts of the melamine derivative of Example 1 (the product of hexamethoxymethyl melamine and commercial acid mixture) and 4.12 parts wax (Atlantic 1115) were added to the aqueous mixture.

The mixture was agitated under high shear while heating at about 80° C. until dispersion was complete, about 10 minutes. The dispersion was then cooled with either mild agitation or no agitation to room temperature.

The dispersion contained 18% solids of which 23.75% was paraffin wax, 71.25% was the melamine derivative, 2.5% was tetradecyldimethylamine acetate and 2.5% was octadecyldimethylamine acetate. This aqueous dispersion had a pH of 4 to 4.5 and was stable for several weeks at 100° F. or for several months at room temperature.

EXAMPLE 42

Pad baths were prepared using the aqueous dispersion of Examples 39, 40, and 41 to give the on weight of fabric pickup indicated in Table V below. Fabric samples of cotton poplin were treated in the pad baths at 90° F. The fabric samples of cotton poplin were then cured at 340° F. for two minutes. Water and oil repellencies were determined initially and after three launderings or three dry cleanings. The conditions and results of these tests are shown in Table V below.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A solid water-repellent composition consisting essentially of
   (a) a melamine-derivative having the structural formula

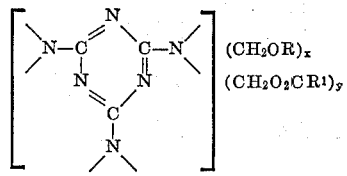

wherein R is an alkyl group of 1 to 6 carbon atoms, $R^1$ is an aliphatic hydrocarbon group of 11 to 23 carbon atoms, $y$ is an integer from 2 to 5 and $x$ plus $y$ totals 6,
   (b) a wax, and
   (c) a surfactant having the structural formula $R^2N(R^3)_2 \cdot HO_2CR^4$, wherein $R^2$ is an alkyl group of 12 to 18 carbon atoms, $R^3$ is an alkyl group of 1 to 4 carbon atoms, and $R^4$ is hydrogen or an alkyl group of 1 to 4 carbon atoms, with the proviso that the surfactant contains a maximum of 25 carbon atoms, said composition containing component (b) in an amount from zero to 80% by weight of components (a) and (b), and said composition containing component (c) in an amount from 3% to 20% by weight of the total mixture.

2. The composition of claim 1 wherein the melamine derivative has a melting point of at least 55° C.

3. The composition of claim 1 wherein the mixture of melamine derivative and wax has a melting point of at least 55° C.

4. The composition of claim 1 wherein the wax component is paraffin wax.

5. An aqueous dispersion containing from 2% to 50% by weight of the composition of claim 1, said dispersion having a pH of less than 5.5.

6. A solid water-repellent composition consisting essentially of

TABLE V

| Commercial Fluorinated Oil and Water Repellent | | Melamine Dispersion | | "Aerotex" [c] Percent OWF | $MgCl_2 \cdot 6H_2O$, Percent OWF | Catalyst RB [d] Percent OWF | "Igepal" [e] Percent OWF | Fabric A [f] | | | | | |
|---|---|---|---|---|---|---|---|---|---|---|---|---|---|
| | | | | | | | | Init. | | 3SL [g] | | 3SDC [h] | |
| Type [a] | Percent OWF [b] | Ex. | Solids Percent OWF | | | | | Oil | Water | Oil | Water | Oil | Water |
| A | 5.0 | 39 | 2.8 | 5.0 | 0.5 | 1.0 | 0.022 | 7 | 100 | 6 | 80 | 7 | 90 |
| B | 5.0 | 40 | 2.4 | 5.0 | 0.5 | 1.0 | 0.022 | 7 | 100 | 6 | 80 | 7 | 90 |
| B | 5.0 | 41 | 2.8 | 5.0 | 0.5 | 1.0 | 0.022 | 7 | 100 | 6 | 80 | 7 | 80 |

[a] Type A, a mixture of fluorinated and nonfluorinated polymers as disclosed in Belgian Patent 645,697 or 634,770, Canadian Patent 697,656, French Patent 1,327,328, Japanese Patent 434,522, Spanish Patent 298,734, British Patent 971,732 or Italian Patent 667,479. Type B, a mixture of fluorinated and crosslinked nonfluorinated polymers, similar to Type A, except it contains a polymerizable nonconjugated divinyl compound free of non-vinylic fluorine.
[b] Percent OWF=percent on weight of fabric.
[c] "Aerotex" Resin 23 Special, A water-soluble melamine-formaldehyde condensate used as a Crease-Proofing agent (American Cyanamid C.).
[d] Catalyst RB, A mixture of 2 parts aluminglycolate and one part glycolic acid used to catalyze polymerization of melamine derivative (CIBA Corp.).
[e] "Igepal" CO-630-nonylphenoxypoly(ethyleneoxy)ethanol (Antara Chem. Co.).
[f] Fabric A, cotton poplin.
[g] 3SL, after three standard launderings.
[h] 3SDC, after three standard dry cleanings.